S. C. MAY.
PEANUT HARVESTER.
APPLICATION FILED JAN. 10, 1919.
1,375,258.
Patented Apr. 19, 1921.
2 SHEETS—SHEET 2.
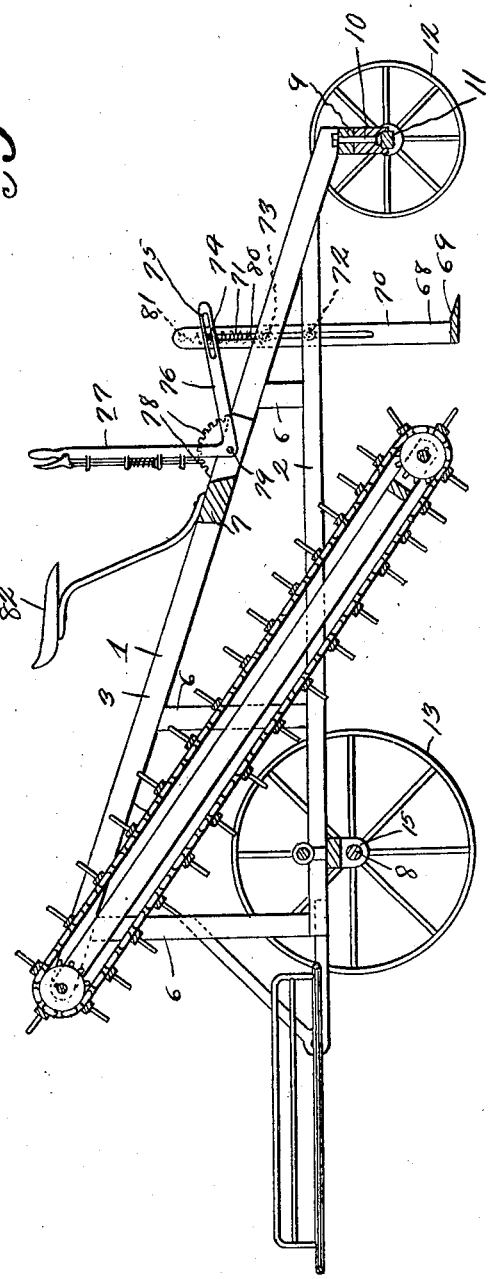
Inventor
S. C. May
By D. Swift & Co.
Attorneys

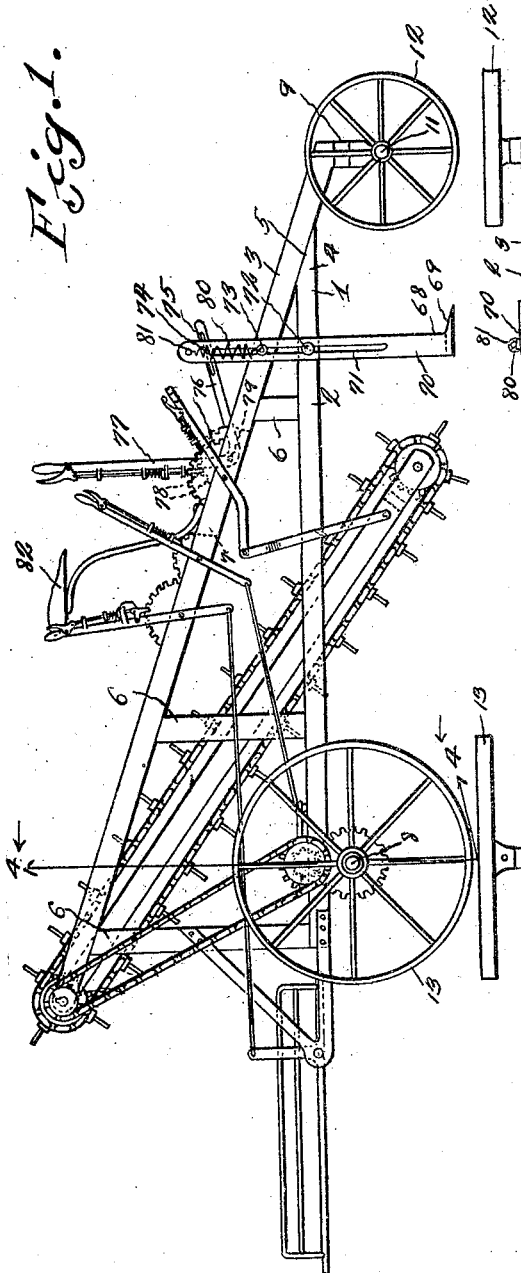

UNITED STATES PATENT OFFICE.

SELLERS C. MAY, OF TROY, ALABAMA.

PEANUT-HARVESTER.

1,375,258. Specification of Letters Patent. Patented Apr. 19, 1921.

Application filed January 10, 1919. Serial No. 270,493.

*To all whom it may concern:*

Be it known that I, SELLERS C. MAY, a citizen of the United States, residing at Troy, in the county of Pike, State of Alabama, have invented a new and useful Peanut-Harvester; and I do hereby declare the following to be a full, clear, and exact description of the invention, such as will enable others skilled in the art to which it appertains to make and use the same.

The object of the invention is to provide a harvesting machine for harvesting peanuts and broadly to provide a machine, which will plow the ground, thereby severing the plant from the ground thereby leaving the plant disconnected from the ground.

A further object is to provide a peanut harvester, wherein the plant plow may be adjusted to different depths in the ground and means whereby the upward and downward movement of the plow may be controlled.

A further object is to provide spring means whereby the plow is normally forced downwardly into engagement with the ground and lever means whereby the plow is held at different distances from the ground.

With the above and other objects in view, the invention resides in the combination and arrangement of parts as hereinafter described, shown in the drawings and claimed, it being understood that changes in the precise embodiment of the invention may be made within the scope of what is claimed without departing from the spirit of the invention.

In the drawings:—

Figure 1 is a side elevation of the harvester.

Fig. 2 is a top plan view of the same.

Fig. 3 is a longitudinal sectional view through the harvester, taken on line 3—3 of Fig. 2.

Referring to the drawings the numeral 1 designates the main frame of the harvester, said frame comprising side pieces 2. Each of the side pieces 2 is formed from inclined bars 3 and horizontal bars 4. The horizontal bars 4 are secured in any suitable manner to the inclined bars 3 as at 5, there being spacing bars 6 interposed between the inclined bars and the horizontal bars and secured thereto in any suitable manner. The side frames 2 are held in spaced relation by means of the cross bar 7 and the frame as a whole is supported on the rear axle 8 and front bolster 9 which are of conventional form. Pivotally secured to the bolster 9 by means of a king pin 10 is the front axle of the harvester, said front axle 11 being provided with wheels 12. Any form of draft means may be secured to the front axle whereby the harvester may be moved along the rows of peanut plants. Rear wheels 13 are secured to the rear axle and rotate therewith.

The plow 68 comprises a horizontal earth cutting portion 69, which is adapted to enter the ground and sever the roots of the plants, and extending upwardly from the horizontal portion 69 are vertical arms 70, which are provided with elongated slots 71, there being headed lugs 72 and 73 which enter the slots 71 of the arms 70 and on these lugs the plow as a whole is adapted to slide in a vertical direction. The lugs 72 and 73 are carried by the side frames 2 of the harvester. The upper ends of the vertical arms 70 of the plow are connected by means of a rod 74, which rod extends through a slot 75 in the arm 76 of the lever 77, which is pivoted at 79 to the connecting bar 7 of the frame. The lever 77 is held in different adjusted positions by means of a detent and rack 78. However the plow is normally forced downwardly, when the detent is out of engagement with the rack by means of springs 80, which have their upper ends secured to lugs 81 and their lower ends secured to the lugs 73. This spring action materially assists the operator who operates from the seat 82 in forcing the horizontal portion 69 of the plow into the ground.

The operation is as follows: The plow is forced down into the ground as the harvester advances until it reaches the proper depth for severing the roots of the plants as the harvester continues its advance.

The invention having been set forth, what is claimed as new and useful is:—

1. The combination with a movable frame of the plow carried by said frame, said plow comprising a horizontally disposed earth and root severing portion, arms extending upwardly from said horizontal portion and engaging the sides of the frame, means carried by the sides of the frame for guiding the plow during a vertical movement, means for moving said plow vertically upwardly or downwardly, and spring means connected to the upwardly extending arms and to the frame whereby a downward movement will be imparted to the plow when the lever is released.

2. The combination with a movable frame, of a plow carried by said frame, said plow comprising a horizontally disposed earth and root severing portion, arms extending upwardly from said horizontal portion and engaging the sides of the frame, vertical slots in said arms, lugs carried by the sides of the frame and disposed in said slots, the upper ends of the arms being connected together by a rod, a lever pivoted to the frame and having one of its arms provided with an elongated slot for the reception of the rod, means for holding said lever in any position to which it may be moved and spring means whereby the plow is normally forced downwardly when the lever holding means are released.

In testimony whereof I have signed my name to this specification in the presence of two subscribing witnesses.

SELLERS $\overset{\text{his}}{\underset{\text{mark}}{\times}}$ C. MAY.

Witnesses:
H. J. SEGARS,
PETE SARBROUGH.